3,743,739
PHARMACEUTICAL COMPOSITIONS CONTAINING 1-BENZOYL-3,5-DIMETHYL PYRAZOLE IN THE TREATMENT OF INFLAMMATION
Jean-Claude Le Douarec, Suresnes, Laszlo Beregi, Boulogne, and Pierre Hugon, Rueil-Malmaison, France, assignors to Societe en nom Collectif Science Union et Cie, Societe Francaise de Recherche Medicale, Suresnes, France
No Drawing. Filed Jan. 10, 1972, Ser. No. 216,760
Claims priority, application France, Jan. 15, 1971, 7101228
Int. Cl. A61k 27/00
U.S. Cl. 424—273          3 Claims

ABSTRACT OF THE DISCLOSURE

Pharmaceutical composition containing therapeutically active 1-benzoyl 3,5-dimethyl pyrazole used in topical applications, in the treatment and the prevention of pain and inflammation of skin, connective tissue or joints.

---

The present invention provides pharmaceutical preparations containing as active ingredient 1-benzoyl-3,5-dimethyl pyrazole of Formula I:

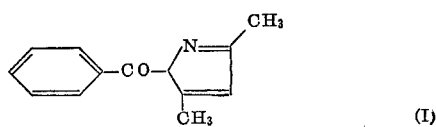

optionally together with pharmaceutically suitable carriers or with other active principles.

The compound of Formula I is known and may be prepared by a method known per se which comprises reacting 3,5-dimethyl pyrazole with benzoyl chloride in the presence of triethylamine and ether.

It has now been found that the compound of Formula I, used in topical application, possesses valuable pharmacological and therapeutic properties, especially analgesic, antiinflammatory and antirheumatic properties; it protects from UV rays and facilitates the penetration of other suitable medicines through intact animal or human skin.

The toxicity of 1-benzoyl-3,5-dimethyl pyrazole is very weak and the $LD_{50}$, in mice, is >2000 mg./kg. per os.

The analgesic activity was studied in mice by the hot plate method [Arch. Int. Pharm. 107, 322 (1956)]. The application of the compound is made by massage of the four paws, for one minute, before the passage on the hot plate at 56° C. It was observed that the reaction time increases of about 50%, 30 to 60 minutes after the treatment.

A very important analgesic activity was also demonstrated for this compound by the method of arthralgia provoked by silver nitrate [La Belle, A., Tislow, R., J. of Pharm. 98, 19 (1950)]. The massage of the joint with the compound for one minute decreases, of from 50 to 75%, the number of the rats' cries.

The antiinflammatory activity was studied on the rat's ear oedema provoked by croton oil [Tonelli, G., et al. Endocrin. 77, 625 (1965), modified by Le Douarec, J. C., et al., J. Pharmacol. 1,395 (1970)].

The topical administration of a solution, containing 100 mg./ml. of the compound, inhibits of from 35 to 40% the inflammation provoked by a 2% croton oil.

An important antiinflammatory activity was also evidenced on the UV erythema in the guinea-pig. When the product is administered, after the UV irradiation, in the form of an alcoholic solution or an ointment at 5 to 20% of the active ingredient, the erythema decreases of from 38 to 65% in comparison with the untreated animals.

A protective effect against the UV irradiation was also noted when the product is administered 15 minutes before the exposition of the animal to the rays. As a matter of fact, a solution at 10% of 1-benzoyl-3,5 dimethyl pyrazole inhibits of 80% the appearance of erythema.

This product also possesses an antilipolytic activity; especially, at the doses of 5 to 50 mg./kg. per os, there has been observed, in the rat, a decrease of from 50 to 80% of the free fatty acids and of from 8 to 12% of the plasmatic triglycerides, while the hepatic triglycerides increase up to 150% and the plasmatic corticosterone increases of from 57 to 62%.

The low toxicity and the here-above described properties enable the use of 1-benzoyl-3,5-dimethyl pyrazole in therapy, especially in the treatment and the prevention of pain and inflammation of skin, connective tissue or joints, such for example, dermatitis, erythema, arthritis.

The product may be administered preferably topically in various pharmaceutical forms, such for example, as lotions, creams, ointments or sprays, optionally together with suitable pharmaceutical carriers such for example, as distilled water, alcohol, lanolin, propyleneglycol stearate or propellants, or with other active principles.

The concentration in active ingredient may be within the range of from 5 to 50%, preferably of from 10 to 25%, for 2 to 5 applications a day.

The following examples illustrate the process for preparing 1-benzoyl-3,5-dimethyl pyrazole and pharmaceutical compositions thereof.

EXAMPLE 1

A solution of 105.3 g. of benzoyl chloride in 300 ml. of anhydrous ether was added dropwise to a solution of 72 g. of 3,5-dimethyl pyrazole and 76 g. of triethylamine in 2400 ml. of anhydrous ether.

The so-obtained suspension was refluxed for one hour, then cooled and taken up with 1000 ml. of water. The organic layer was washed first with 100 ml. of a normal hydrochloric acid solution then with 200 ml. of water.

After drying, concentration, then distillation of the residue, there were obtained 120 g. of 1-benzoyl-3,5-dimethyl pyrazole, B.P./0.8 mm.: 107–108° C., $n_D^{25}$: 1.5715.

EXAMPLE 2

Alcoholic lotion

|   | G. |
|---|---|
| 1-benzoyl-3,5-dimethyl pyrazole | 20 |
| Mixture of phosphate bearing and oxyethylenated oleic ethers | 2.5 |
| Oleic alcohol | 5 |
| Triethanolamine | 0.5 |
| Distilled water | 35 |
| Alcohol at 95°, q.s.p. 100 g. | |

EXAMPLE 3

Ointment

|   | G. |
|---|---|
| 1-benzoyl-3,5-dimethyl pyrazole | 20 |
| Vegetable cream | 12 |
| Acetylated lanolin | 9 |
| Lanolin alcohol | 12 |
| Sorbitan sesquioleate | 2 |
| Distilled water, q.s.p. 100 g. | |

EXAMPLE 4

Cream

|  | G. |
|---|---|
| 1-benzoyl-3,5-dimethyl pyrazole | 20 |
| Propyleneglycol stearate | 20 |
| Fluid lanolin | 2 |
| Methyl paraoxybenzoate | 0.15 |
| Propyl paraoxybenzoate | 0.05 |
| Distilled water, q.s.p. 100 g. | |

EXAMPLE 5

Spray

|  | G. |
|---|---|
| 1-benzoyl-3,5-dimethyl pyrazole | 20 |
| Ethylic alcohol | 5 |
| Polyoxyethylenated oleic ether | 1 |
| Fluid propellant: Freon 11/12 (50—50%) | 74 |

We claim:

1. A method of treating a living animal or human body afflicted with inflammation of the skin connective tissue or joints, which comprises administering to said body an antiinflammatorily effective amount of 1-benzoyl 3,5-dimethyl pyrazole with a pharmaceutically acceptable carrier.

2. A method as claimed in claim 1 wherein the amount of 1-benzoyl 3,5-dimethyl pyrazole is comprised between 5 and 50% by weight.

3. A method as claimed in claim 1 wherein the carrier is in the form of a lotion, ointment, cream or spray.

References Cited

Chem. Abstract, Seventh Collective Subject Index. $P_5$—Sn, p. 19070.

STANLEY J. FRIEDMAN, Primary Examiner

UNITED STATES PATENT OFFICE
CERTIFICATE OF CORRECTION

Patent No. 3,743,739          Dated July 3, 1973

Inventor(s) Jean-Claude LeDouarec, Laszlo Beregi, Pierre Hugon

It is certified that error appears in the above-identified patent and that said Letters Patent are hereby corrected as shown below:

Column 1, line 30, delete the formula as shown, insert the following formula:

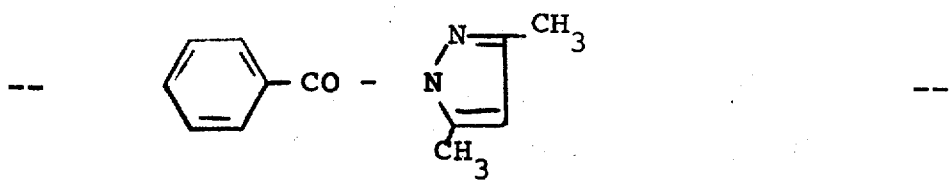

Column 4, lines 5 and 9, after the word "benzoyl", insert a "hyphen" "-".

Signed and sealed this 7th day of January 1975.

(SEAL)
Attest:

McCOY M. GIBSON JR.
Attesting Officer

C. MARSHALL DANN
Commissioner of Patents